(12) United States Patent
Lee et al.

(10) Patent No.: US 9,660,681 B1
(45) Date of Patent: May 23, 2017

(54) TUNABLE OPTICAL MODULE FOR OPTICAL COMMUNICATION

(71) Applicant: DiCon Fiberoptics, Inc., Richmond, CA (US)

(72) Inventors: Ho-Shang Lee, El Sobrante, CA (US); Yu-Sheng Yang, Kaohsiung (TW)

(73) Assignee: DICON FIBEROPTICS INC., Richmond, CA (US)

( * ) Notice: Subject to any disclaimer, the term of this patent is extended or adjusted under 35 U.S.C. 154(b) by 21 days.

(21) Appl. No.: 14/925,719

(22) Filed: Oct. 28, 2015

(51) Int. Cl.
G02B 6/32 (2006.01)
G02B 6/26 (2006.01)
G02B 6/42 (2006.01)
H04B 1/38 (2015.01)
H04Q 11/00 (2006.01)

(52) U.S. Cl.
CPC ........... H04B 1/38 (2013.01); H04Q 11/0005 (2013.01); *H04Q 2011/003* (2013.01); *H04Q 2011/0009* (2013.01); *H04Q 2011/0015* (2013.01); *H04Q 2011/0016* (2013.01); *H04Q 2011/0018* (2013.01); *H04Q 2011/0026* (2013.01); *H04Q 2011/0035* (2013.01)

(58) Field of Classification Search
CPC ....... H04Q 11/0005; H04Q 2011/0009; H04Q 2011/0015; H04Q 2011/0016; H04Q 2011/0018; H04Q 2011/0026; H04Q 2011/0003; H04B 1/38
See application file for complete search history.

(56) References Cited

U.S. PATENT DOCUMENTS

| 7,899,330 | B2 | 3/2011 | Ye et al. | |
|---|---|---|---|---|
| 8,699,024 | B2* | 4/2014 | Colbourne | G02B 27/4244 356/300 |
| 2005/0007675 | A1* | 1/2005 | Matsumoto | G02B 3/0087 359/652 |
| 2007/0177145 | A1* | 8/2007 | Ohishi | G01J 3/02 356/328 |
| 2010/0272403 | A1* | 10/2010 | Chen | G02B 6/4206 385/93 |
| 2010/0321754 | A1* | 12/2010 | Ikeda | G02B 6/3518 359/225.1 |
| 2012/0275744 | A1* | 11/2012 | Yang | G02B 6/3518 385/17 |

\* cited by examiner

*Primary Examiner* — Robert Tavlykaev
(74) *Attorney, Agent, or Firm* — Vierra Magen Marcus LLP

(57) ABSTRACT

Light of at least two wavelengths is collimated in a forward path towards a reflector and light of at least one of the wavelengths is focused and detected in a return path, using in both paths a lens unit including a first convex surface and a second surface. A diffraction element diffracts the collimated light of the at least two wavelengths into different wavelength components. The reflector is moved so that one or more of the different wavelength components will be focused by the lens unit in the return path and detected. The second surface reflects the light of the at least two wavelengths from an input port towards the first convex surface and the first convex surface collimates the reflected light of the at least two wavelengths in the forward path, or the first convex surface focuses the one or more wavelength components towards the second surface that reflects the one or more wavelength components to an output port in the return path. The first convex surface can be replaced by a GRIN lens performing the focusing and collimating functions.

30 Claims, 11 Drawing Sheets

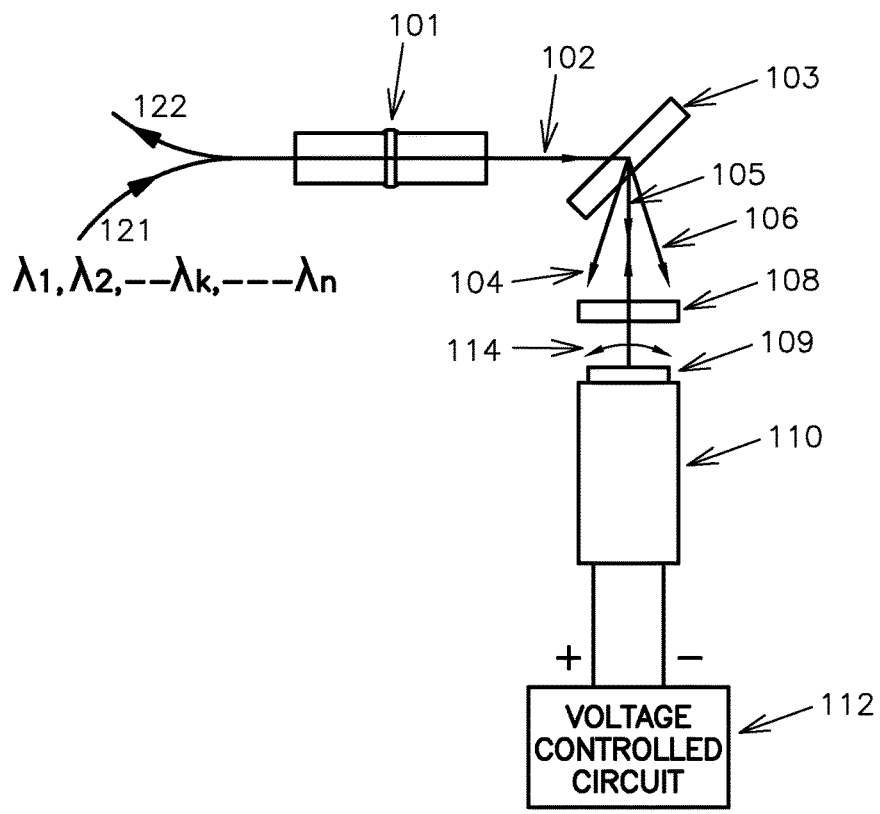
Fig. 1A—Prior Art
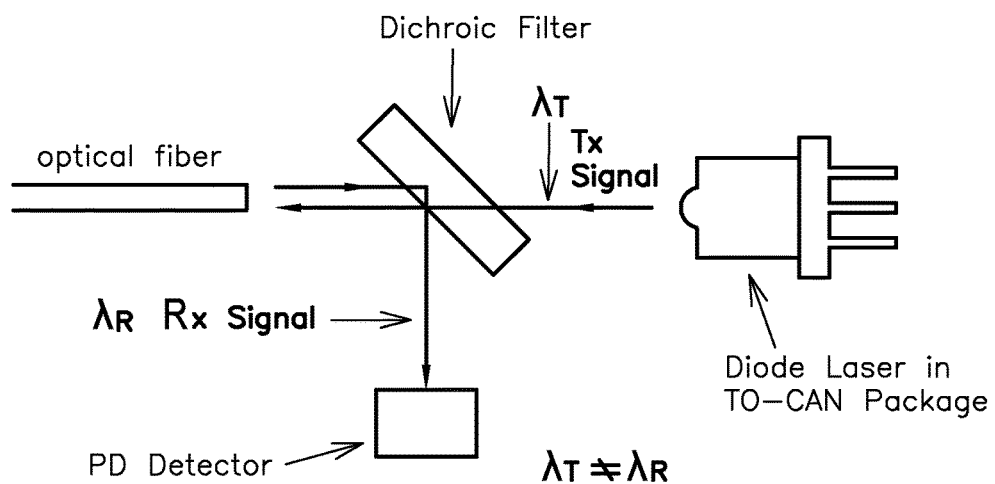
Two-Wavelength Bidirectional Transmission
Fig. 1B—Prior Art

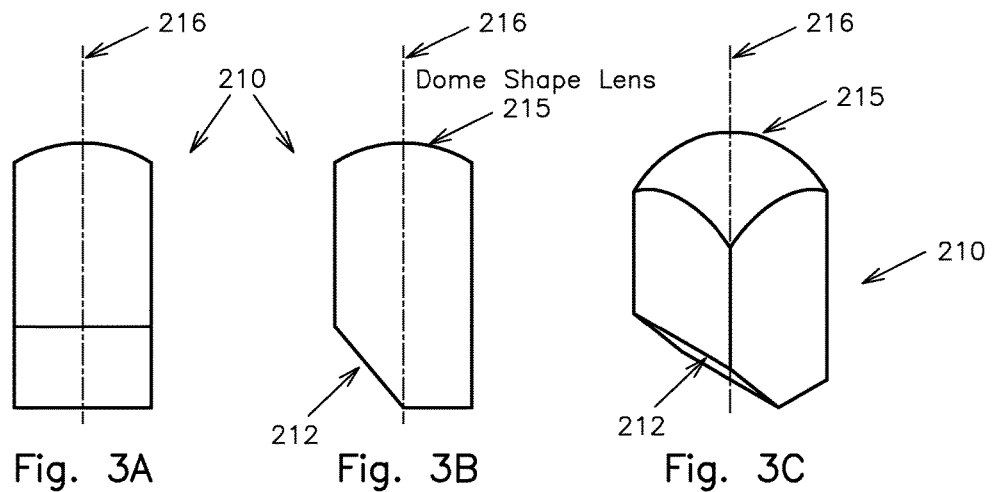
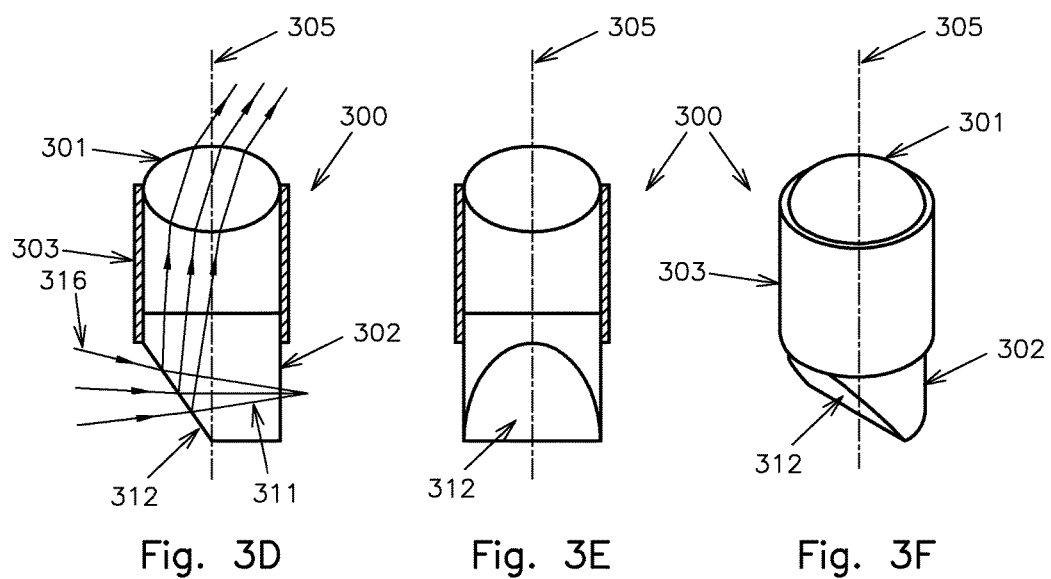

TUNABLE OPTICAL MODULE FOR OPTICAL COMMUNICATION

BACKGROUND

This invention relates generally to the optical components used in optical communication networks, and specifically to a hybrid optical module that combines an electrically-tunable optical filter, optical source(s) and a novel lens unit.

Optical communication networks are built by combining sub-systems, modules, or components which perform specific functions, including the function of selecting or removing a particular wavelength or group of wavelengths. Briefly, multiple optical signals can be transmitted simultaneously by encoding them in separate carrier wavelengths similar to the way radio stations use different carrier frequencies to which the end user tunes. Encoding multiple signals using different carrier wavelengths is referred to as Dense Wavelength Division Multiplexing (DWDM). A general description of optical networking functions and applications can be found in "Introduction to DWDM Technology", by S. Kartalopoulos, Wiley-Interscience, 2000. In this application, "multiple" means "more than one."

DWDM Technology has been widely deployed in long haul communications networks. Recently, this technology started migrating to short-haul optical communications networks, for applications such as Digital TV delivery, Fiber-to-the-Home (FTTH), Internet access, Local Area Networks, back-haul connections for cellular base stations, Wi-Fi hotspots, and other forms of broadband access. In prior networks, it has been typical for only one specified wavelength to reach the receiver of an end user, who also sends a single wavelength back to the network. This transmitter-receiver (transceiver) module at the end user is called a bi-directional wavelength add-drop module. However, with increasing demands for bandwidth and network flexibility, multiple wavelengths may be broadcast or delivered to an end user, and then one wavelength (or potentially a small range of wavelengths) is selected by the end user. There is, therefore, a strong demand to provide an integrated module that combines a photodetector with a tunable optical filter, to select particular wavelength(s) from a multiple-wavelength DWDM optical signal, which also includes a transmitter or a group of transmitters to send a different wavelength or a band of different wavelengths back to the network. Furthermore, to meet the requirements and needs of short-distance optical systems, these tunable transceivers have to be compact, reliable, inexpensive, and producible on a large scale. There is also a demand for sub-assemblies of the above system that may not include all of the components of the system to serve as building blocks of the system.

SUMMARY OF THE INVENTION

One embodiment of the invention is directed to a tunable optical device, comprising a reflector, an input port and an output port and a lens unit collimating light of at least two wavelengths from the input port in a forward path and focusing light of at least one of the at least two wavelengths to the output port in a return path. The lens unit includes a first convex surface and a second surface. The device also has at least one diffraction element that is located in the forward path and/or the return path between the lens unit and the reflector and that diffracts the collimated light of the at least two wavelengths into different wavelength components; and an actuator that moves the reflector so that one or more of the different wavelength components will travel in the return path to the lens unit and be focused to the one output port by the lens unit. The second surface reflects the light of the at least two wavelengths from the input port towards the first convex surface and the first convex surface collimates the reflected light of the at least two wavelengths in the forward path, or the first convex surface focuses the one or more wavelength components towards the second surface that reflects the one or more wavelength components to the output port in the return path.

Another embodiment of the invention is directed to an optical tuning method, comprising collimating light of at least two wavelengths from an input port in a forward path towards a reflector and focusing light of at least one of the at least two wavelengths to an output port in a return path, using a lens unit including a first convex surface and a second surface. At least one diffraction element located in the forward path and/or the return path between the lens unit and the reflector is used to diffract the collimated light of the at least two wavelengths into different wavelength components. The reflector is moved so that one or more of the different wavelength components will travel in the return path to the lens unit and be focused to the one output port by the lens unit. The second surface reflects the light of the at least two wavelengths from the input port towards the first convex surface and the first convex surface collimates the reflected light of the at least two wavelengths in the forward path, or the first convex surface focuses the one or more wavelength components towards the second surface that reflects the one or more wavelength components to the output port in the return path.

Still another embodiment of the invention is directed to a tunable optical device, comprising a reflector, an input port, an output port and a lens unit collimating light of at least two wavelengths from the input port in a forward path and focusing light of at least one of the at least two wavelengths to the output port in a return path, the lens unit including a focus/collimation element and a surface. The device includes at least one diffraction element that is located in the forward path and/or the return path between the lens unit and the reflector and that diffracts the collimated light of the at least two wavelengths into different wavelength components; and an actuator that moves the reflector so that one or more of the different wavelength components will travel in the return path to the lens unit and be focused to the one output port by the lens unit. The surface reflects the light of the at least two wavelengths from the input port towards the focus/collimation element and the focus/collimation element collimates the reflected light of the at least two wavelengths in the forward path, or the focus/collimation element focuses the one or more wavelength components towards the surface that reflects the one or more wavelength components to the output port in the return path.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

BRIEF DESCRIPTION OF THE DRAWINGS

FIGS. 1A and 1B illustrate prior art instruments of a wavelength tunable filter and a bi-directional transmitter-receiver (called transceiver for short) respectively.

FIGS. 3A through 3C show a slanted dome lens, which is used to reflect, collimate/focus, and combine the optical power. FIGS. 3D through 3F illustrate another lens assembly functioning in the same way.

FIG. 4A shows an optical ray that is either totally reflected or refracted at an optical interface, if the incident angle is more or less than the critical angle, respectively. FIG. 4B illustrates a ray that is reflected at the optical interface by a reflective coating, if the incident angle is less than the critical angle.

FIG. 7A is a cross-section view of the photodetector package and FIG. 7B shows the entrance window of the photodetector package, with the aperture in the center.

Identical components are labeled by the same numerals in this application. The optical paths and the angles of diffraction in the figures are not drawn to scale.

DETAILED DESCRIPTIONS OF THE PREFERRED EMBODIMENTS

Figure 2A:
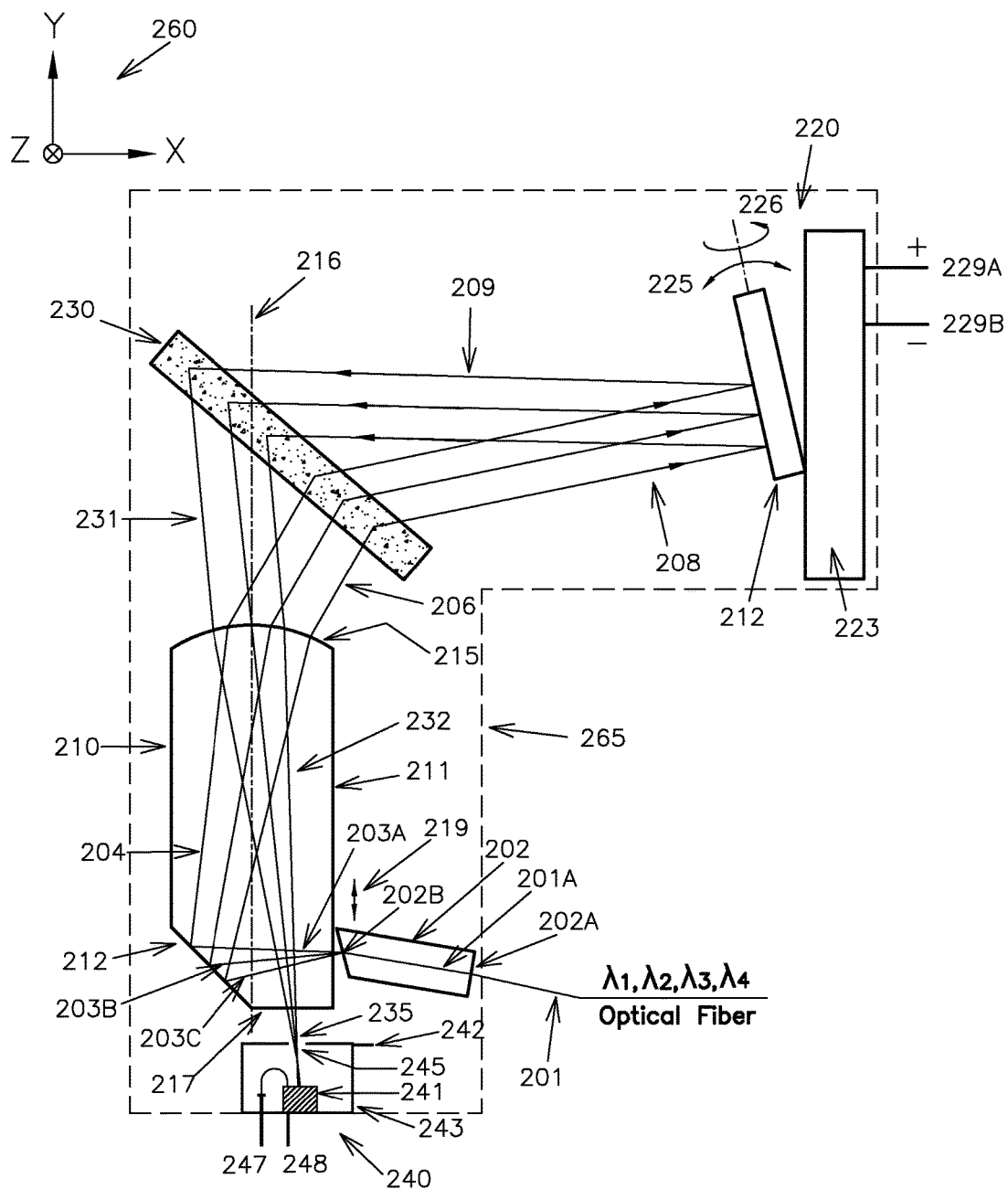
FIG. 2A shows one embodiment of the present invention. One of the multiple wavelengths from an incident signal is selected by a tunable filter and sent to an integrated photodetector in a compact assembly in a container.

The present invention utilizes a lens unit, which can be a novel lens or novel lens assembly, having the functions of processing optical signals for filtering, attenuation, detection, and transmission, together in a single module. The lens is used to integrate an optical tunable filter, attenuator, photodetector, diode laser(s), and an optical port, in a compact unit.

FIG. 1A, excerpted from U.S. Pat. No. 7,899,330, illustrates how a diffraction grating and a Micro-Electro-Mechanical-System (MEMS) based mirror are used to select a wavelength from a group of wavelengths, that have been angularly dispersed via a diffraction grating. The optical power of an input fiber 121 carrying multiple wavelengths is collimated by a lens assembly 101 and then enters a diffraction grating 103, which disperses different wavelengths in slightly different angles, as illustrated by rays 104, 105, and 106, respectively. One wavelength is selectively reflected by the rotatable mirror 109 (its rotation is indicated by 114) back to an output fiber 122, after passing through the diffraction grating 103 a second time. The rotation angle of the mirror is controlled by the control voltage 112. (Note that element 108 is a quarter wave plate that rotates the polarization of the optical beam by 90 degrees.)

FIG. 1B illustrates a bi-directional transmitter-receiver module of the prior art, which allows the photodetector to receive only a single wavelength $\lambda_R$ and sends a different wavelength $\lambda_T$ back to the optical fiber.

FIG. 2A illustrates one embodiment (or device) 220 of the present invention in which a signal with multiple wavelengths from an optical port is filtered, attenuated and then sent to a photodetector. An input optical signal travels from an input port, through a lens unit and a diffraction element towards a reflector in a forward path, and is reflected by the reflector back towards the diffraction element and then to the lens unit in a return path to an output port, where the return signal is detected, as described below. An input optical fiber 201 at an input port carries an optical signal consisting of at least two wavelengths, such as multiple wavelengths $\lambda_1$, $\lambda_2$, $\lambda_3$, and $\lambda_4$, for example. Obviously a larger or fewer number of wavelengths than four may be used and are within the scope of the invention. For example, input fiber 201 may carry only two wavelengths of light. The fiber end 201A is embedded in a ceramic or glass ferrule 202. For convenience of assembly, the fiber can be terminated at the end surface 202A of ferrule 202. Then an additional optical fiber for bringing in the signal is optically connected with Fiber stub 201A at the end surface 202A. The signal exits the fiber at the other end surface 202B of the ferrule 202, and spread outs with an angle that is determined by the Numerical Aperture NA of the fiber, as represented by the three rays, 203A, 203B and 203C. Then the multi-wavelength signal is reflected at a slanted surface 212 of the lens 210, by either total internal reflection, or by use of a reflective coating, if the incident angle to the slanted surface 212 is more or less than the critical angle, respectively. The lens 210 has an optical axis that is denoted by dashed line 216. The slanted surface 212 is created by methods such as tilting the lens end and then polishing toward the optical axis 216. Surface 212 is on one side of and at a slanted angle relative to axis 216 and is located in a position opposite to the convex surface 215 of lens 210.

The reflection of the multi-wavelength signal at slanted surface 212 is described in more detail in FIG. 4. FIG. 4A depicts a ray, either 412 or 415, that is incident on an optical interface 410 from a high index material $n_2$ such as glass 402, to a low index material $n_1$ such as air 401. Line 404 is the normal to the interface surface 410. Ray 415 experiences total internal reflection at the optical interface 410 because its incident angle $\theta_L$ is larger than the critical angle $\theta_C$. In contrast, incident ray 412 is refracted at the interface 410 and exits as ray 413, in accordance with Snell's law. When the incident angle is smaller than the critical angle as illustrated in FIG. 4B, a reflective coating 435, such as a dielectric thin-film stack or simply a reflective metal, is coated onto the slanted surface 433 (or surface 212 in FIG. 2A).

The incident rays represented by 203A, 203B, and 203C in FIG. 2A and the reflected rays 204 and their subsequent rays (206, 208, etc.) remain in an optical plane, here defined as the x-y plane indicated in 260. The signal reflected at the surface 212 in FIG. 2A continues to travel inside the dome lens 210, to hit a convex surface (or dome) 215, that has focus length f and collimates the signal into a parallel beam 206 before entering the diffraction grating 230 for wavelength-dependent angular dispersion. The diameter of parallel beam 206 can range from 0.3 to 2.5 millimeters depending on the requirements of wavelength resolution. The smaller the wavelength difference is between adjacent channels (typically ranging from a few nanometers down to 0.2 nanometer for optical communication networks), the larger the focus length (and therefore the beam diameter) that is required. The multiple wavelengths $\lambda_1$, $\lambda_2$, $\lambda_3$, and $\lambda_4$ are dispersed at slightly different angles, and one beam 208 which may contain one or more of these wavelengths (or component[s] having wavelengths within one or more wavelength ranges) is selectively reflected by the rotatable MEMS mirror 212 to a beam 209 that enters the grating 230 a second time for further wavelength separation (see U.S. Pat. No. 7,899,330). The returned beam 209 containing one or more wavelength components (or component[s] having wavelengths within one or more wavelength ranges) exits the grating as the beam 231 and is focused by the dome 215 of lens 210, exiting the lens via an end surface 217, to a spot 235 within an aperture 245 of an entrance window 242. The end surface 217 is situated on the side of lens 210 that is opposite to the slanted surface 212, with respect to the optical axis 216. As used herein in this application, the term "wavelength components" will include components having wavelengths within one or more wavelength ranges.

The MEMS mirror, mounted on a substrate 223, has two rotational axes, 225 and 226. The axis 225 is used to selectively reflect one or more wavelengths or wavelength ranges to a photodetector 241, while having the beam remain in the optical plane x-y. In some cases, there is also a need to attenuate the signal strength for the photodetector. Thus the other rotational axis 226 is used to tune the optical beam slightly out of the x-y plane, in order to reduce or attenuate the optical power of the beam that reaches the photodetector 241.

Figure 7A:
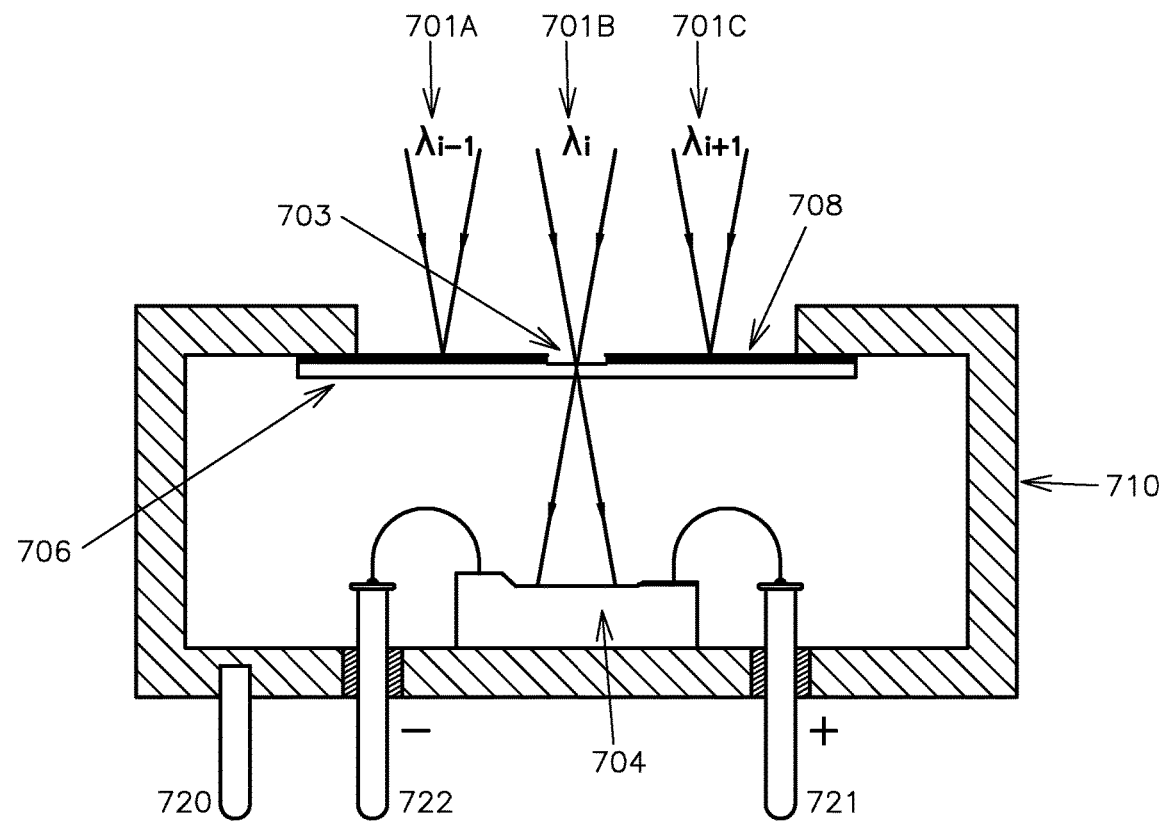
FIGS. 7A and 7B shows a photodetector package with a small aperture to accept only a single wavelength (or, potentially, a single wavelength range) directed to the photodetector chip.
Figure 7B:
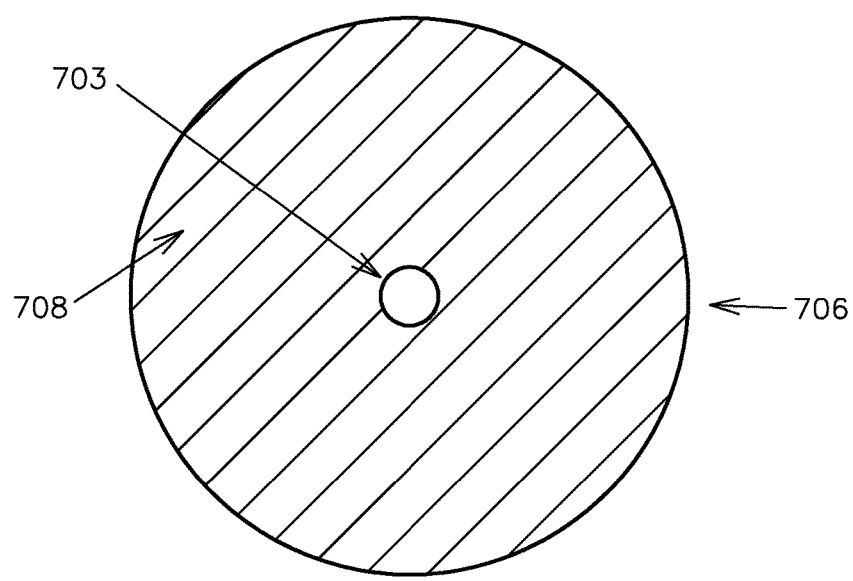

A more detailed structural view of the photodetector package 240 shown in FIG. 2A, is shown in FIGS. 7A and 7B. In FIG. 7A, the selected wavelength (or wavelength ranges centered at) $\lambda_t$ is focused within an aperture 703 in an entrance window 706, which is coated with a reflective or absorptive (opaque) material 708, with the exception of the aperture area 703. Adjacent wavelengths (or wavelength ranges centered at) $\lambda_{i-1}$ and $\lambda_{i+1}$ in the beam 231 focused to package 240, that enter the lens dome 215 (these adjacent wavelengths are not shown in FIG. 2A) with angles slightly different from $\lambda_t$, are thus focused outside the aperture 703, and are therefore blocked from reaching the photodetector 704. The diameter of a circular aperture 703, for example, typically ranges from a few micrometers to a few tens of micrometers. The bandwidth of a selected wavelength component(s) or wavelength ranges that can pass the aperture decreases with the size of the aperture. Thus, aside from the tunable filtering capability (performed by grating 230 and the MEMS mirror 212) depicted and described in reference to FIG. 2A above, the aperture size 703 provides another design parameter for determining the bandwidth of the light entering the photodetector 241. The smaller the aperture size, the narrower will be the bandwidth of the selected wavelength component(s) or wavelength range(s). The ferrule 202 shown in FIG. 2A is free to move around (indicated by arrows 219) before being fixed in place, in order to optically align $\lambda_t$ to the aperture 703. The photodetector chip 704 is bonded to the base of a housing 710 and electrically wired to two electrodes 721 and 722, in order to output a current once an optical beam is impinged on it. FIG. 7B shows an "overhead" or plan view of the entrance window 706 and aperture 703. An opaque coating is coated on a thin disk 706, with the exception of the aperture area 703. Other methods, such as opening a pin hole in the center of a metal disk to create an aperture, are also within the scope of the present invention.

FIGS. 3A through 3C illustrate the geometry of the lens 210 with a dome surface 215 at one end of the rod for focusing or collimating the beam, and a slanted reflective surface 212 at the other end of the lens 210. The rod is shown as a rectangle here but other shapes are also applicable. Dashed line 216 is the optical axis of the dome lens 210. FIG. 3C is a perspective view of the dome lens 210, and FIGS. 3A and 3B are its front and side views, respectively.

FIGS. 3D through 3F illustrate another embodiment of lens assembly 300 that provides the same functionality as dome lens 210 in FIGS. 3A through 3C. A traditional convex lens 301 that serves to focus the beam is assembled via a tubing 303 with an optical block 302, which has a slanted surface 312 for reflecting an incoming beam 311 (and potentially transmitting an outgoing beam 316 to the input port). Dashed line 305 is the optical axis of the lens assembly 300. Slanted surface 312 is slanted with respect to and on one side of axis 305 and is located in a position opposite to lens 301. Other lens assemblies having at least one convex surface for focus, as well as a slant surface opposite to the lens, are also within the scope of the present invention. Aside from using traditional convex lens 301 in FIG. 3D, other lenses such as Graded Index (GRIN) lens having focus/collimation capability without a convex surface may be used instead and are also within the scope of the present invention. In such event, slanted surface 312 will be slanted with respect to and on one side of the axis (not shown) of the GRIN lens and is located in a position opposite to the GRIN lens located in the position of convex lens 301 in FIG. 3D.

Figure 2B:
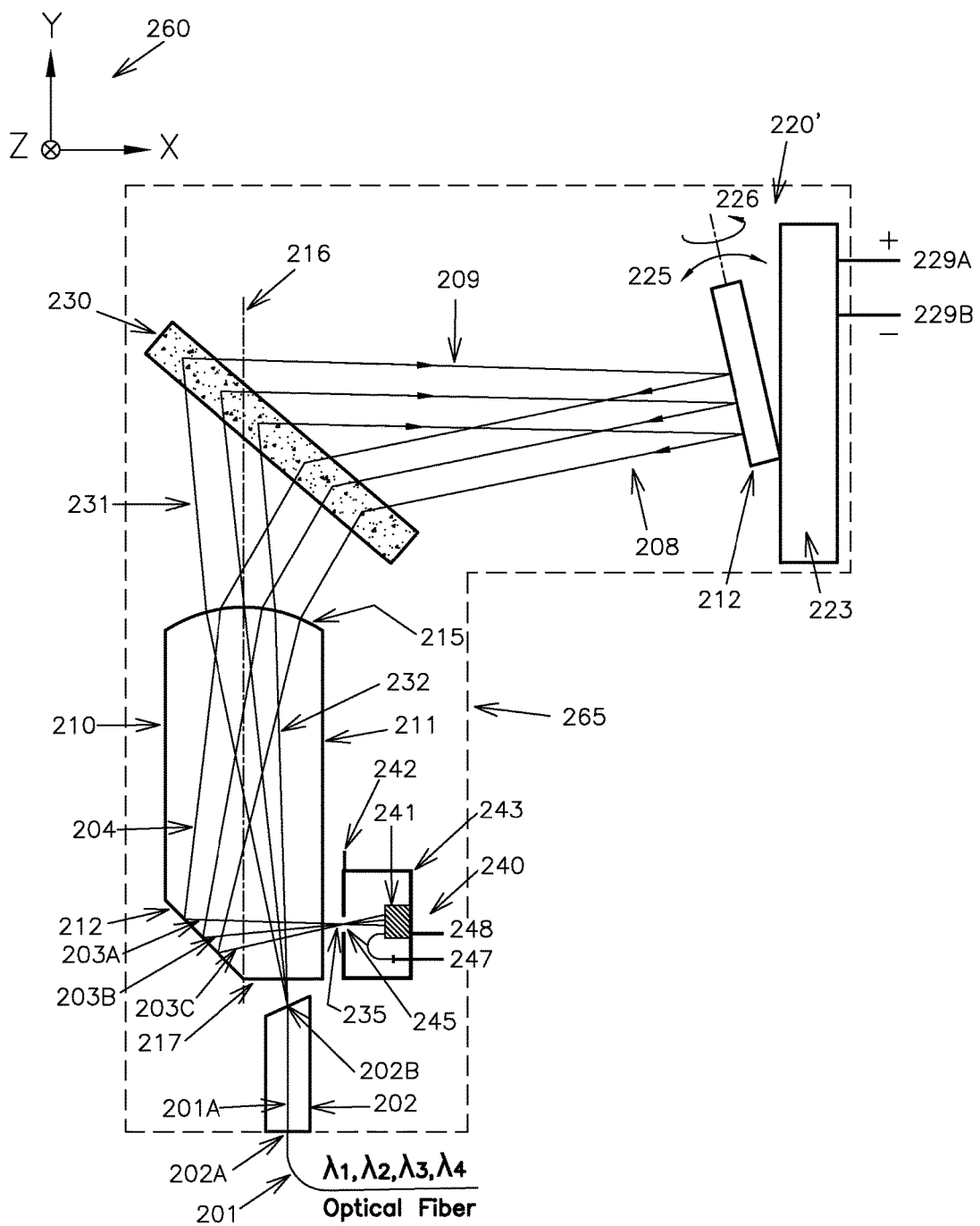
FIG. 2B shows another embodiment of the present invention, which exchanges the location of the photodetector with that of the input optical fiber.
Figure 2C:
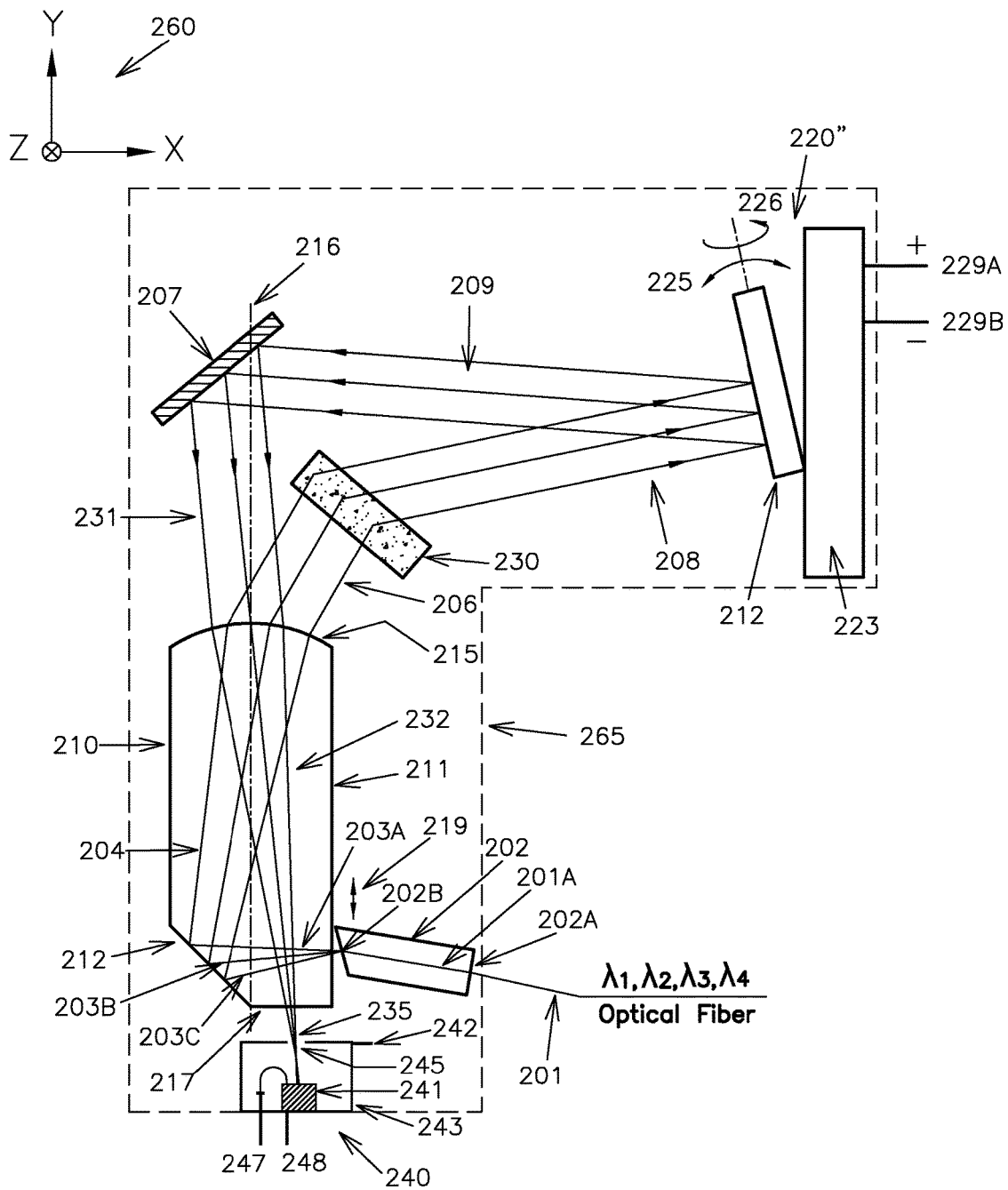
FIG. 2C shows another embodiment of the present invention where the multiple wavelengths from an incident signal are diffracted once instead of twice.

To make the tunable receiver more convenient for installation inside a Multi-Source Agreement (MSA) pluggable cage assembly such as Compact Form-factor Pluggable (CFP), and Small Form Factor Pluggable (SFP) cages it may be necessary to orient the ferrule 202 of the optical fiber 201 such that it lines up with the dome lens 210, with the ferrule 202 protruding out of the front panel of MSA pluggable cage assemblies. All of the components of the device 220 may be contained within a compact container shown in dotted line in FIG. 2A. FIG. 2B is an alternative embodiment (or device) 220' to embodiment 220 and shows that the locations of ferrule 202 and photodetector 240 are swapped or reversed, in comparison with FIG. 2A. Here in FIG. 2B, the light from the input fiber 201 enters the flat surface 217 of the lens, and then reaches the dome 215, without involving slanted surface 212 in the forward path. Instead, the returned beam 204 in the return path from the grating is reflected at the slanted surface 212, and then enters the photodetector 240. In contrast, in the embodiment or device 220 of FIG. 2A, for beam 231 that is focused by dome 215 directly to photodetector package 240 in the return path, slanted surface 212 is not involved. With the exception of the positions of the ferrule 202 and photodetector 240 and the differences noted above, one skilled in the art will recognize that the operation of the embodiment shown in FIG. 2B is otherwise the same as the operation of the embodiment shown in FIG. 2A. In both embodiments 220 and 220', the diffraction element 230 is located in both the forward and return paths to diffract the signal twice. While this is desirable since diffracting the wavelengths twice results in better angular and spatial separation between the wavelength components, this is not required. In still another variation as shown in device 220" of FIG. 2C, the diffraction element 230 is located in only the forward path (and not in the return path)

and to diffract the signal only once and not twice. In the return path, beam 209 is reflected and not diffracted by reflector 207 to convex surface 215 for focusing to the photodetector 240. Obviously, instead of being located only in the forward path, the diffraction element 230 may swap places with reflector 207 so that it is located in only the return path (and not in the forward path). Instead of employing only one diffraction element 230, more than one diffraction element may be used in the forward path and/or the return path to diffract the optical signal more than twice, as shown in U.S. Pat. No. 7,899,330. All such and other variations are within the scope of the invention.

Figure 5:
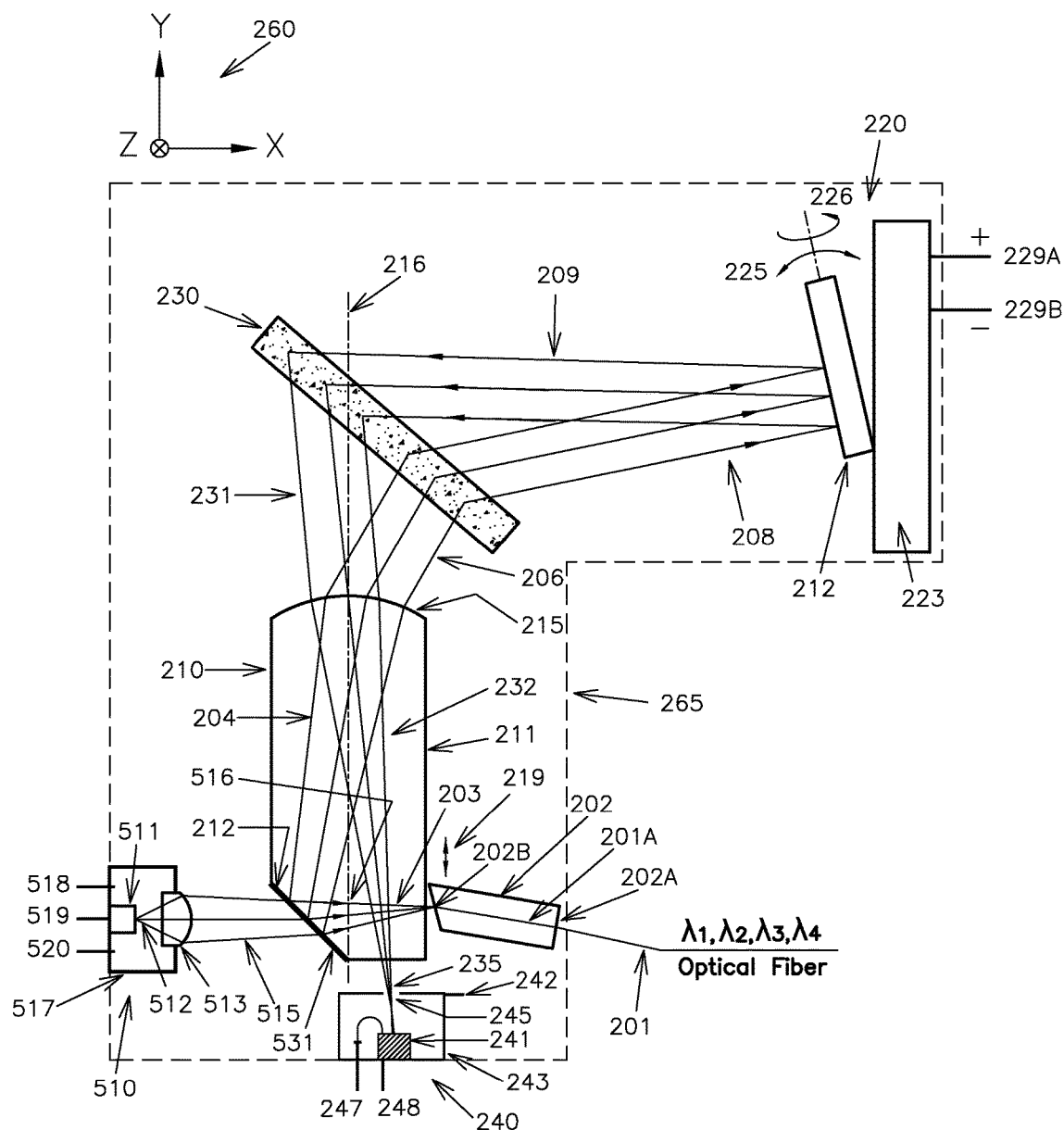
FIG. 5 shows an embodiment of the present invention that adds a signal wavelength to the embodiment shown in FIG. 2A.

In addition to detecting one or more wavelength out of multiple wavelengths, the end clients or customers in an optical network often need to add a signal back to the network, for a variety of purposes, including network supervision. FIG. 5 illustrates another embodiment of the present invention, which adds a signal with a wavelength $\lambda_T$ that is different from the received wavelengths to the optical assembly shown in FIG. 2A. A laser diode package 510 includes the basic elements of a laser diode 511 (its emitting wavelength being either fixed or tunable), a focusing lens 513, a housing 517 and the laser diode's electrodes 518, 519, and 520. A beam 512, with wavelength $\lambda_T$, is emitted by laser diode 511, and is focused by a lens 513, either spherical or aspherical, and then hits the slanted surface 212, which is coated with a dichroic filter 531, comprising a stack of dielectric thin film layers. The dichroic filter transmits wavelength $\lambda_T$ from the laser diode, but reflects the incident wavelengths ($\lambda_1$, $\lambda_2$, $\lambda_3$, $\lambda_4$, etc.) from the input optical fiber 201. The laser signal $\lambda_T$ is then focused to the fiber end 202B, and then is transmitted out on fiber 201. Furthermore, multiple wavelengths $\lambda_{T1}$, $\lambda_{T2}$ and $\lambda_{T3}$, for example, emitted from multiple diode lasers, respectively, can be multiplexed by an optical multiplex (not shown in the FIG. 5) as a transmission band $\lambda_T$ to come out as a beam 515 and then enters the dichroic filter 531. Each individual laser can be turned on or off to dynamically choose particular wavelength(s) for being added back to the network.

Figure 4A:
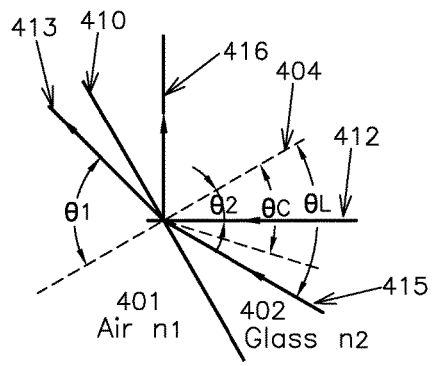
FIGS. 4A and 4B illustrate how an optical signal consisting of multiple wavelengths is reflected, and also combined at an optical interface.
Figure 4B:
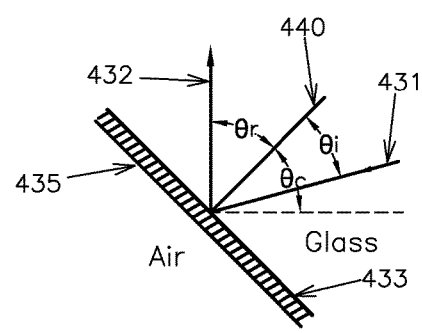
Figure 4C:
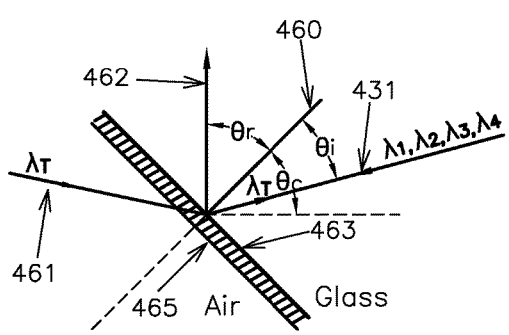
FIG. 4C illustrates a dichroic thin film coating that is used to transmit or reflect light in two wavelength bands.
Figure 4D:
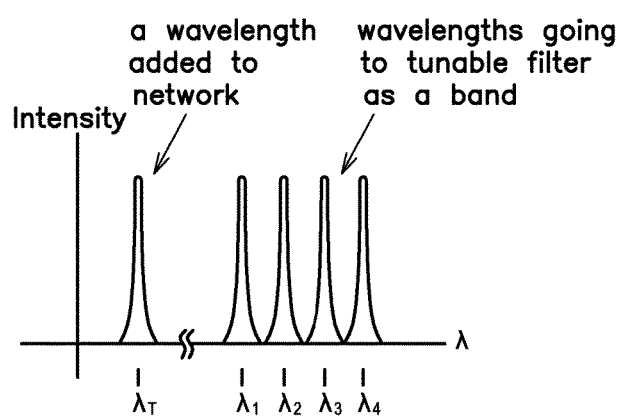
FIG. 4D shows spectral locations of two respective bands of FIG. 4C that are transmitted or reflected by the dichroic coating.

FIGS. 4C and 4D illustrate how a dichroic filter functions (including the dichroic filter 531 of FIG. 5). A dichroic filter 465 is coated onto the interface 463 of a glass and air. Line 460 is the normal to the interface 463. A ray 431 carrying a multiple of wavelengths that is incident onto the interface 463 with an angle $\theta_i$ less than the critical angle $\theta_c$, is reflected by the dichroic filter 465. In contrast, a beam carrying a wavelength $\lambda_T$ passes the dichroic filter 465. The spectral locations of the laser diode wavelength $\lambda_T$ and the multiple received wavelengths $\lambda_1$, $\lambda_2$, $\lambda_3$ and $\lambda_4$ (or a wavelength band of received wavelengths) are shown in FIG. 4D. Wavelength $\lambda_T$ is outside of the band of received wavelengths, typically by a few tens of nanometers or more.

Figure 6A:
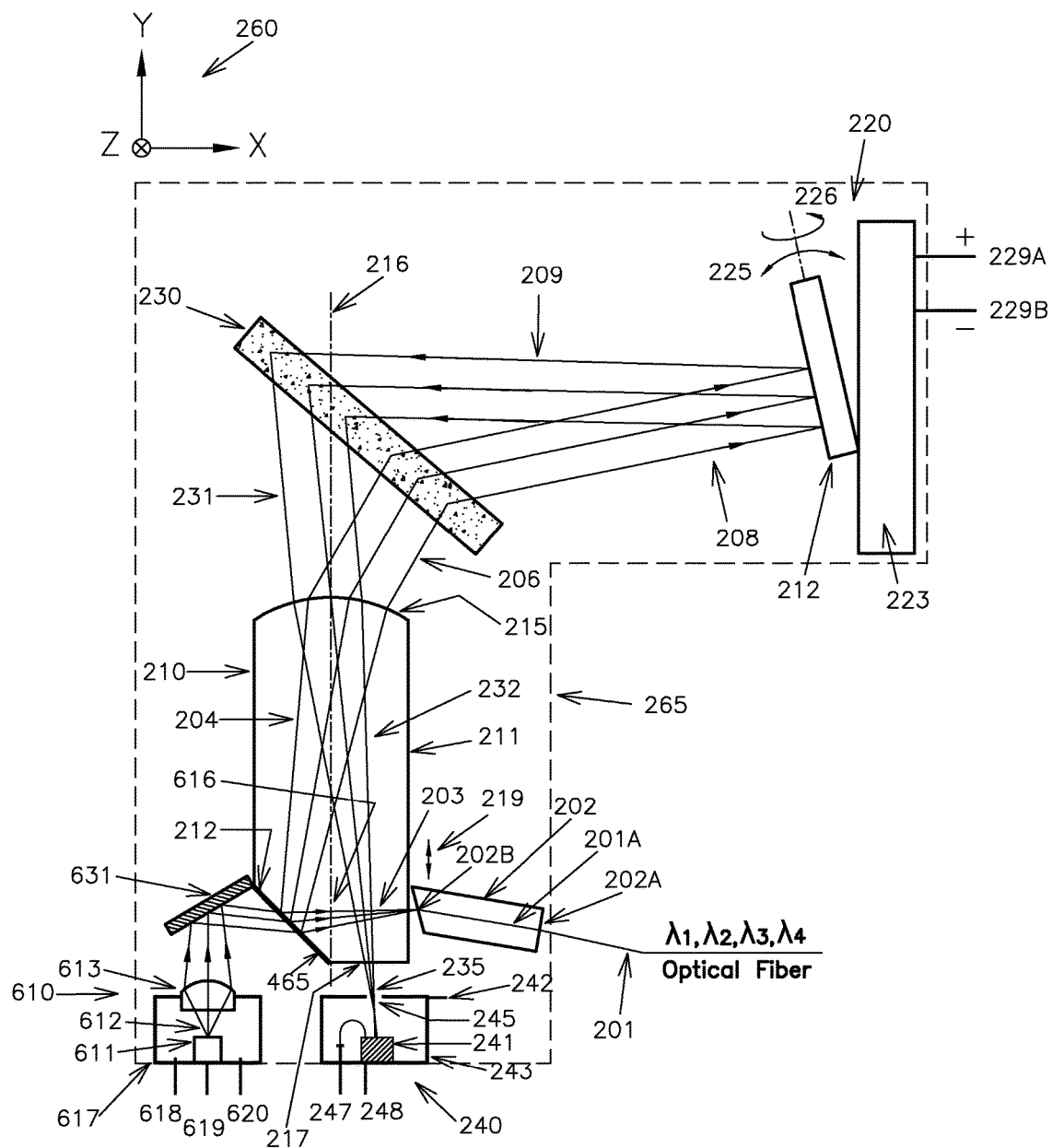
FIG. 6A shows yet another embodiment of the present invention, in which the location of the diode laser package in FIG. 5 is oriented to be more compact.

In order to make the assembly of tunable optical add-drop module even more compact, the laser diode package 617 can be re-oriented to be side-by-side with the photodetector package 240, as shown in FIG. 6A. A reflective mirror 631 is added to re-direct the rays 612 that are emitted from the laser diode 611 and focused by lens 613, to the optical interface 212.

Figure 6B:
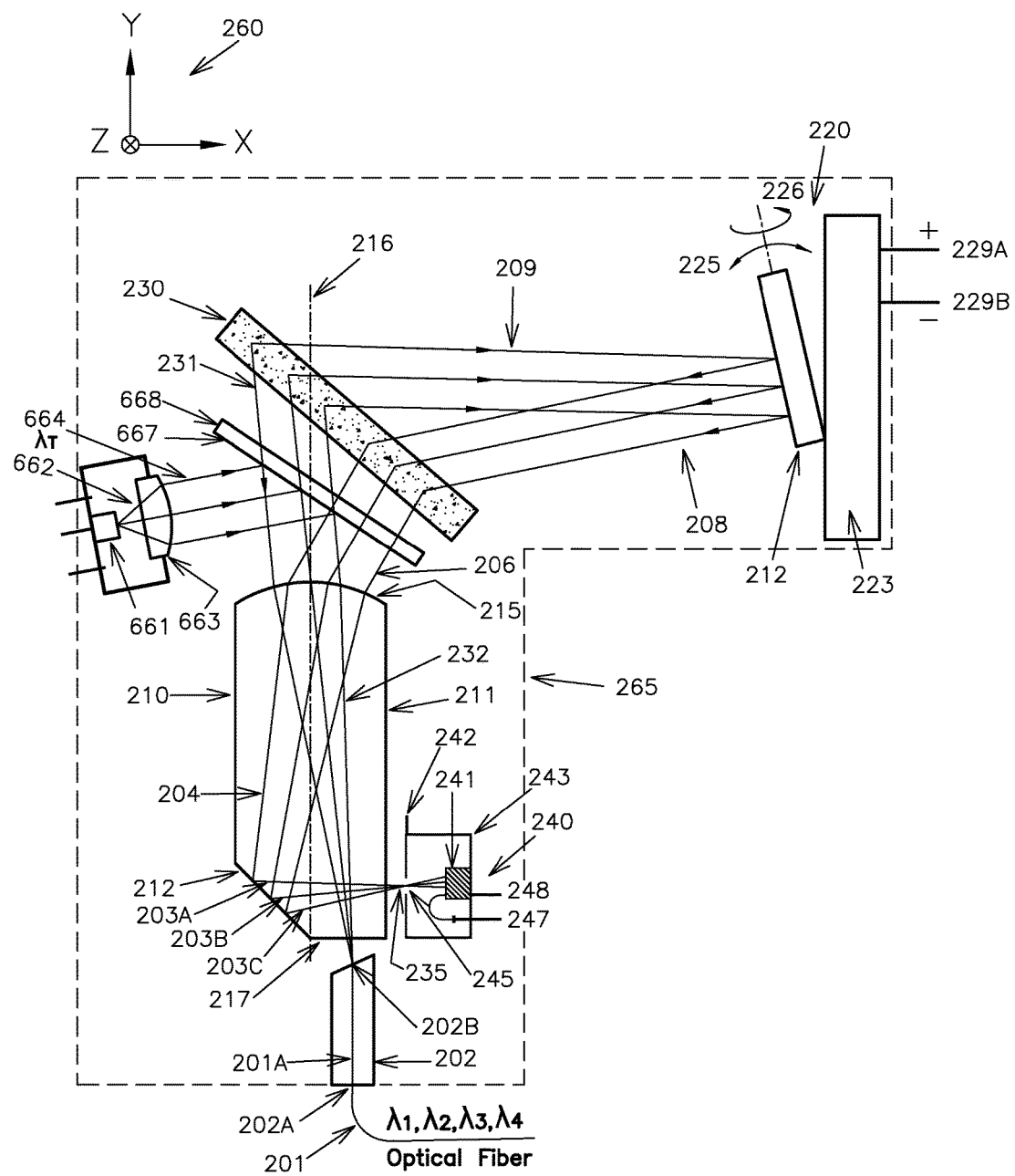
FIG. 6B illustrates another embodiment in which a dichroic filter is interposed between the dome lens and the diffraction grating.

Instead of coating the dichroic filter on the slanted surface 212, as shown in FIGS. 5 and 6A, the dichroic filter 667 may be interposed between the dome surface 215 and the diffraction grating 230, as shown in the embodiment of the present invention depicted in FIG. 6B. The collimated beam 206, which carries a multiple of wavelengths closely packed in a band, transmits through the dichroic coating 667 in the return path. The beam 662 emitted from the laser diode 661, with wavelength $\lambda_T$, is collimated by a lens 663 to become a collimated beam 664, which is reflected by the dichroic filter 667 and then focused by surface 215 to the fiber end 202B of the optical fiber 201 at the input port.

Figure 6C:
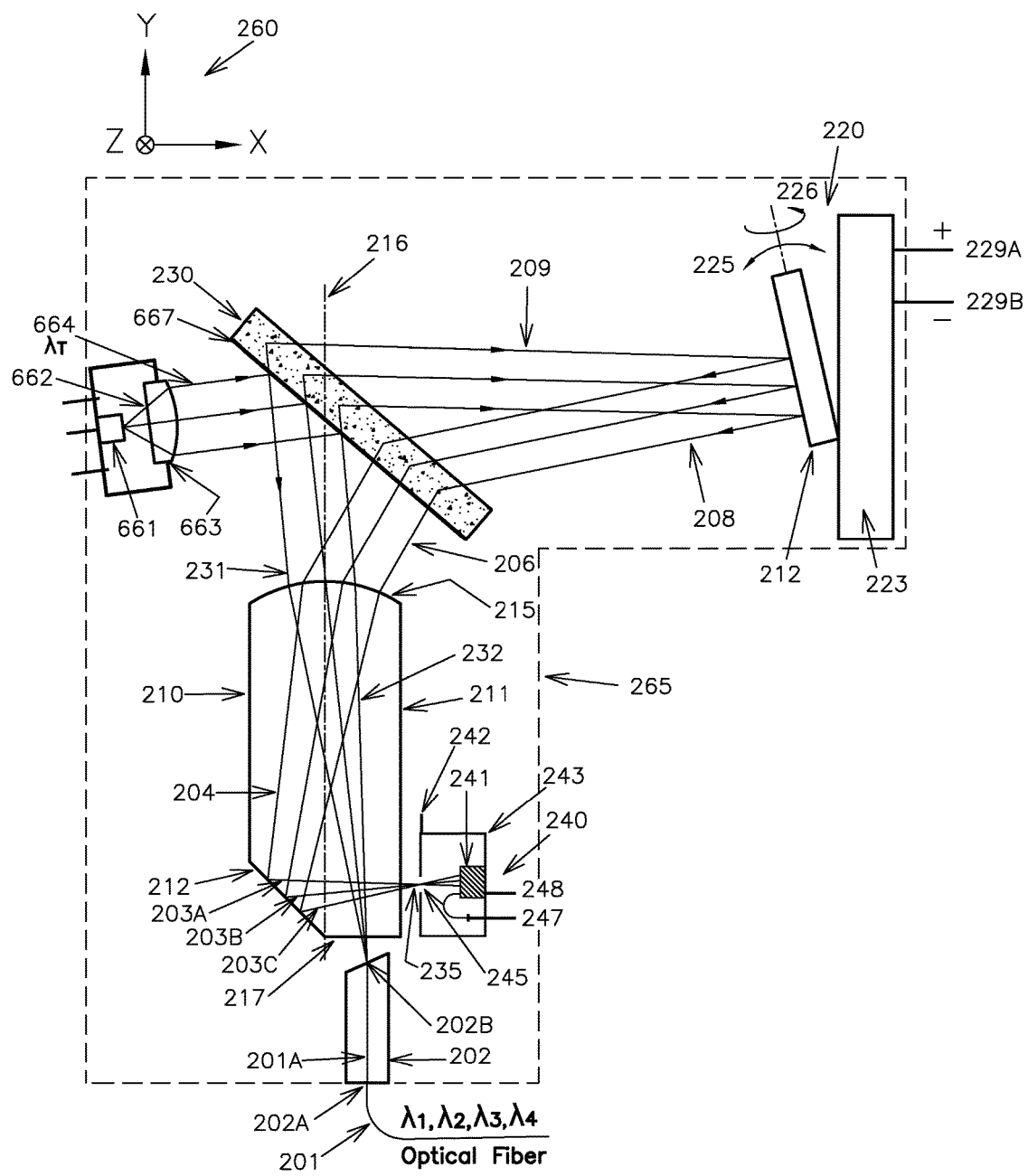
FIG. 6C illustrates a variation of this embodiment in which the dichroic filter is directly coated on one side of the grating substrate, opposite to the grating.

Instead of using a separate substrate 668, coated with a dichroic filter 667 (as shown in FIG. 6B), in another embodiment the dichroic filter 667 can be coated directly to the flat side of the grating substrate 230, as shown in FIG. 6C, in order to save space. The dotted line denoted by 265 in each of FIGS. 2A-2C, 5, 6A-6C represents a container containing all of the components of each of the devices shown in such figures.

While the invention has been described above by reference to various embodiments, it will be understood that changes and modifications may be made without departing from the scope of the invention, which is to be defined only by the appended claims and their equivalents. For example, lens 210 with a dome surface 215 as shown in FIGS. 5, 6A, 6B and 6C may be replaced by the combination of lens 301, tubing 303 and surface 312 shown in FIG. 3D. Moreover, instead of using the traditional convex lens 301 of FIG. 3D in the embodiments of FIGS. 5, 6A, 6B and 6C, other lenses such as Graded Index (GRIN) lens having focus/collimation capability without a convex surface may be used and are also within the scope of the present invention.

The invention claimed is:

1. A tunable optical device, comprising:
    an input port and an output port;
    a lens unit collimating light of at least two wavelengths from the input port in a forward path and focusing light of at least one of said at least two wavelengths to the output port in a return path, said lens unit including a first convex surface and a second surface;
    a reflector;
    at least one diffraction element that is located in the forward path and/or the return path between the lens unit and the reflector and that diffracts said collimated light of said at least two wavelengths into different wavelength components; and
    an actuator that moves the reflector so that one or more of said different wavelength components will travel in said return path to the lens unit and be focused to said one output port by the lens unit;
    wherein the second surface reflects the light of the at least two wavelengths from the input port towards the first convex surface and the first convex surface collimates the reflected light of the at least two wavelengths in the forward path, or said first convex surface focuses the one or more wavelength components towards said second surface that reflects the one or more wavelength components to the output port in the return path.

2. The device of claim 1, wherein when the second surface reflects the light of the at least two wavelengths from the input port towards the first convex surface and the first convex surface collimates the reflected light of the at least two wavelengths in the forward path, said first convex surface focuses the one or more wavelength components to the output port in the return path without involving said second surface.

3. The device of claim 1, wherein said first convex surface collimates the light of the at least two wavelengths from the input port in the forward path without involving the second surface and focuses the one or more wavelength components towards said second surface that reflects the one or more wavelength components to the output port in the return path.

4. The device of claim 1, wherein the actuator that moves the reflector so that an intensity of said one or more wavelength components is controlled to be of a desired value.

5. The device of claim 4, wherein the actuator rotates the reflector about two different axes, wherein rotation of the reflector about one of the axes causes selection from the at least two wavelengths the one or more wavelength components that travel in the return path, and rotation about the other one of the axes causes attenuation of said one or more of said different wavelength components.

6. The device of claim 1, wherein the at least one diffraction element diffracts said collimated light of the at least two wavelengths from the lens unit into different wavelength components towards the reflector, and said reflector reflects the different wavelength components towards the at least one diffraction element so that the different wavelength components are diffracted.

7. The device of claim 1, further comprising an optical source providing light of one or more desired wavelengths to the input port, so that the device functions as a transceiver.

8. The device of claim 7, further comprising a dichroic filter coating on said second surface to reflect light from the input port and transmit light from the optical source.

9. The device of claim 8, further comprising a second reflector that reflects light from the optical source to the dichroic filter coating.

10. The device of claim 7, further comprising a dichroic filter between the convex surface and the at least one diffraction element to transmit light from the input port and reflect light from the optical source.

11. The device of claim 10, wherein the dichroic filter is a coating on the at least one diffraction element.

12. The device of claim 1, further comprising a photodetector package that includes an aperture and a photodetector aligned to the aperture for receiving light directed to the output port.

13. The device of claim 12, wherein the input port is movable to align a desired wavelength component of the diffracted different wavelength components with the aperture, and wherein the aperture does not transmit the diffracted different wavelength components that are not the desired wavelength component to the photodetector.

14. The device of claim 1, said lens unit including a lens element with said first convex surface having an optical axis and said second surface is at a slanted angle to and on one side of the optical axis.

15. The device of claim 1, said lens unit including a convex lens and a transparent block with a surface at a slanted angle to an axis of the convex lens.

16. The device of claim 1, further comprising an optical fiber ferrule at the input port and a photodetector package at the output port, and a container that contains the optical fiber ferrule, the lens unit, the at least one diffraction element, the reflector, the actuator and the photodetector package.

17. The device of claim 16, further comprising an optical source providing light of one or more desired wavelengths to the input port so that the device functions as a transceiver, said container also containing the optical source.

18. The device of claim 1, wherein said second surface is a reflecting surface.

19. An optical tuning method, comprising:
collimating light of the at least two wavelengths from an input port in a forward path towards a reflector and focusing light of at least one of said at least two wavelengths to an output port in a return path, using a lens unit including a first convex surface and a second surface;
using at least one diffraction element located in the forward path and/or the return path between the lens unit and the reflector to diffract said collimated light of the at least two wavelengths into different wavelength components; and
moving the reflector so that one or more of said different wavelength components will travel in said return path to the lens unit and be focused to said one output port by the lens unit;
wherein the second surface reflects the light of the at least two wavelengths from the input port towards the first convex surface and the first convex surface collimates the reflected light of the at least two wavelengths in the forward path, or said first convex surface focuses the one or more wavelength components towards said second surface that reflects the one or more wavelength components to the output port in the return path.

20. The method of claim 19, wherein when the second surface reflects the light of the at least two wavelengths from the input port towards the first convex surface and the first convex surface collimates the reflected light of the at least two wavelengths in the forward path, said first convex surface focuses the one or more wavelength components to the output port in the return path without involving said second surface.

21. The method of claim 19, wherein said first convex surface collimates the light of the at least two wavelengths from the input port in the forward path without involving the second surface and focuses the one or more wavelength components towards said second surface that reflects the one or more wavelength components to the output port in the return path.

22. The method of claim 19, wherein the input port is moved to align a desired wavelength component of the diffracted different wavelength components with an aperture and a photodetector, and wherein the aperture does not transmit the diffracted different wavelength components that are not the desired wavelength component to the photodetector, and wherein said input port is fixed in position after said alignment.

23. The method of claim 19, further comprising passing the light directed to the output port through an aperture to a photodetector aligned to the aperture for detection.

24. The method of claim 23, further comprising adjusting a dimension of the aperture to determine a bandwidth of the wavelength component(s) that passes the aperture to the photodetector.

25. A tunable optical device, comprising:
an input port and an output port;
a lens unit collimating light of at least two wavelengths from the input port in a forward path and focusing light of at least one of said at least two wavelengths to the output port in a return path, said lens unit including a first convex surface and a second surface;
a reflector;
at least one diffraction element that is located in the forward path and/or the return path between the lens unit and the reflector and that diffracts said collimated light of the at least two wavelengths into different wavelength components; and
an actuator that moves the reflector so that one or more of said different wavelength components will travel in said return path to the lens unit and be focused to said one output port by the lens unit;

wherein said first convex surface collimates the light of the at least two wavelengths from the input port in the forward path without involving the second surface and focuses the one or more wavelength components towards said second surface that reflects the one or more wavelength components to the output port in the return path.

26. The device of claim 25, further comprising an optical source providing light of one or more desired wavelengths to the input port, so that the device functions as a transceiver.

27. The device of claim 26, further comprising a dichroic filter between the convex surface and the at least one diffraction element to transmit light from the input port and reflect light from the optical source.

28. The device of claim 27, wherein the dichroic filter is a coating on the at least one diffraction element.

29. A tunable optical device, comprising:
an input port and an output port;
a lens unit collimating light of at least two wavelengths from the input port in a forward path and focusing light of at least one of said at least two wavelengths to the output port in a return path, said lens unit including a focus/collimation element and a surface;
a reflector;
at least one diffraction element that is located in the forward path and/or the return path between the lens unit and the reflector and that diffracts said collimated light of said at least two wavelengths into different wavelength components; and
an actuator that moves the reflector so that one or more of said different wavelength components will travel in said return path to the lens unit and be focused to said one output port by the lens unit;
wherein the surface reflects the light of the at least two wavelengths from the input port towards the focus/collimation element and the focus/collimation element collimates the reflected light of the at least two wavelengths in the forward path, or said focus/collimation element focuses the one or more wavelength components towards said surface that reflects the one or more wavelength components to the output port in the return path.

30. The device of claim 29, wherein said focus/collimation element comprises a convex lens or a GRIN lens and a transparent block with a surface at a slanted angle to an axis of the convex or GRIN lens.

* * * * *